United States Patent Office 3,433,149
Patented Mar. 18, 1969

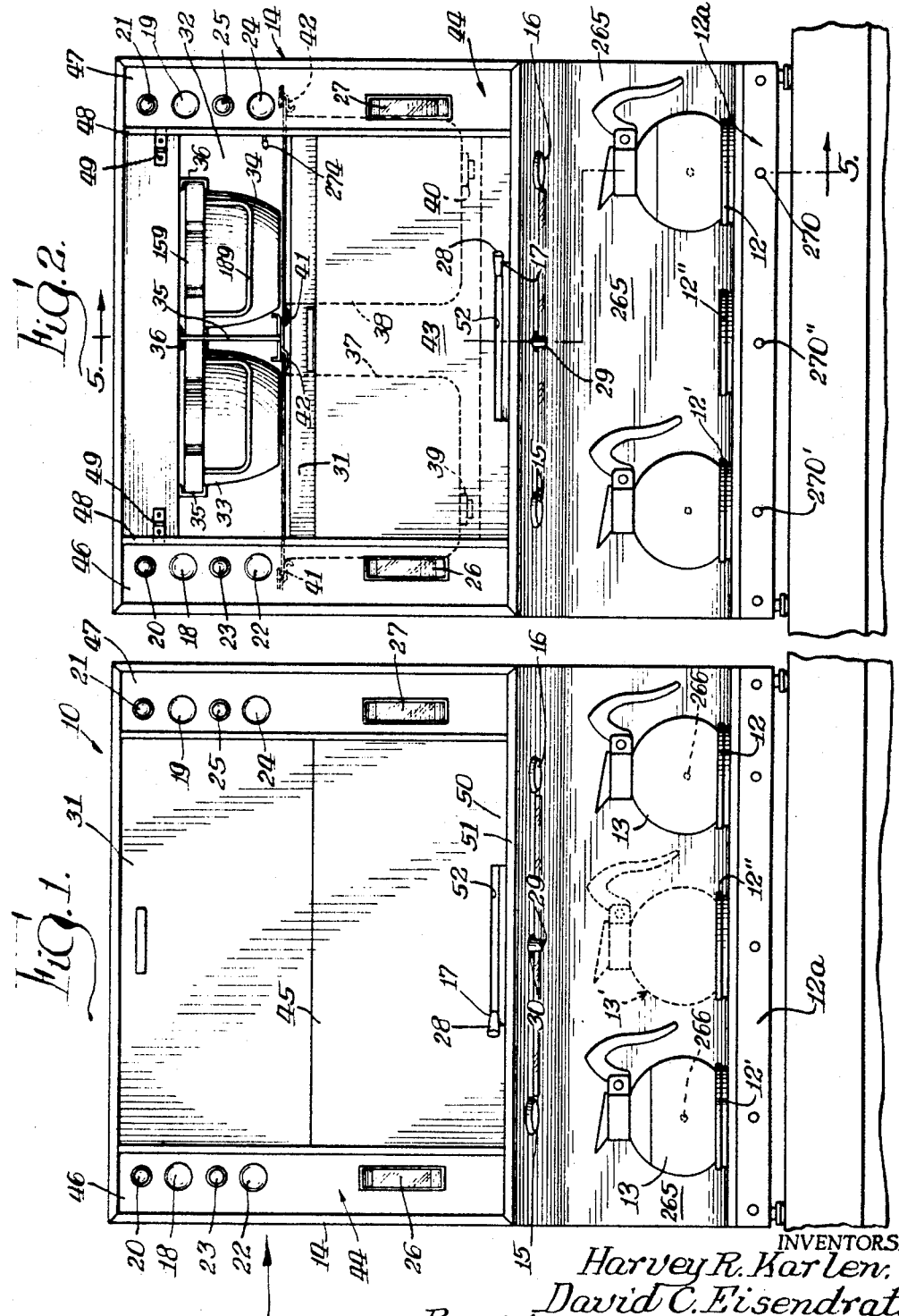

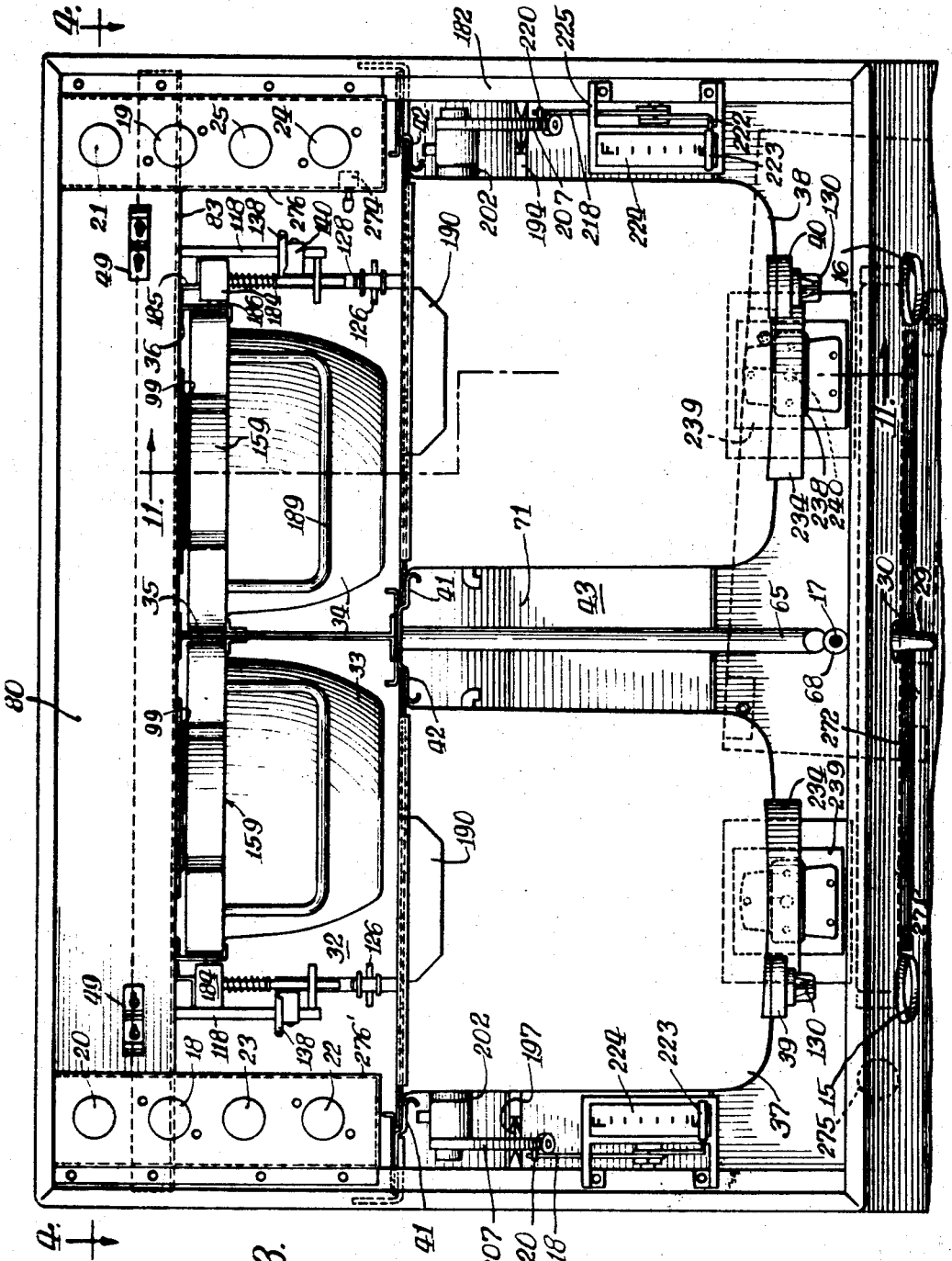

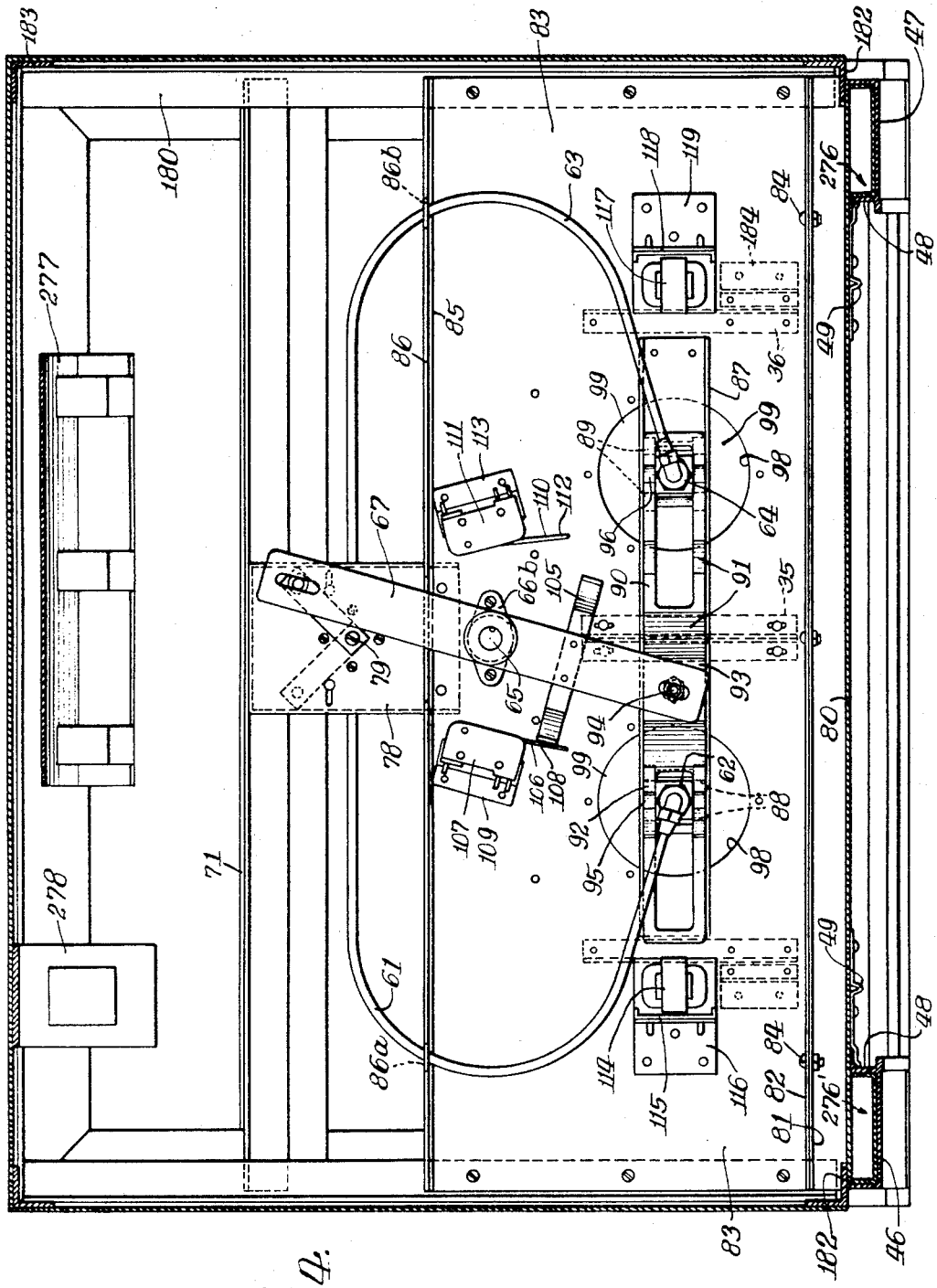

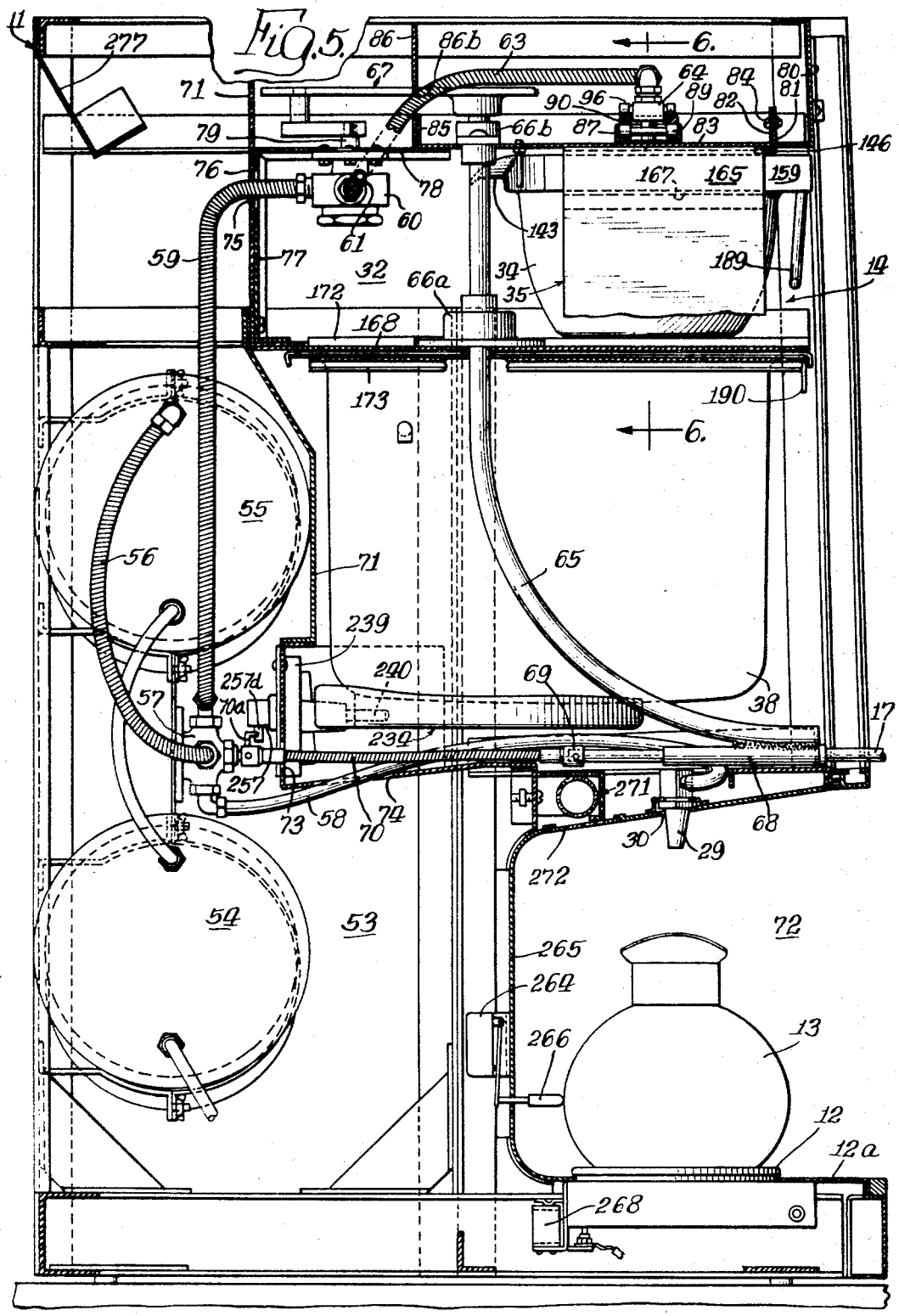

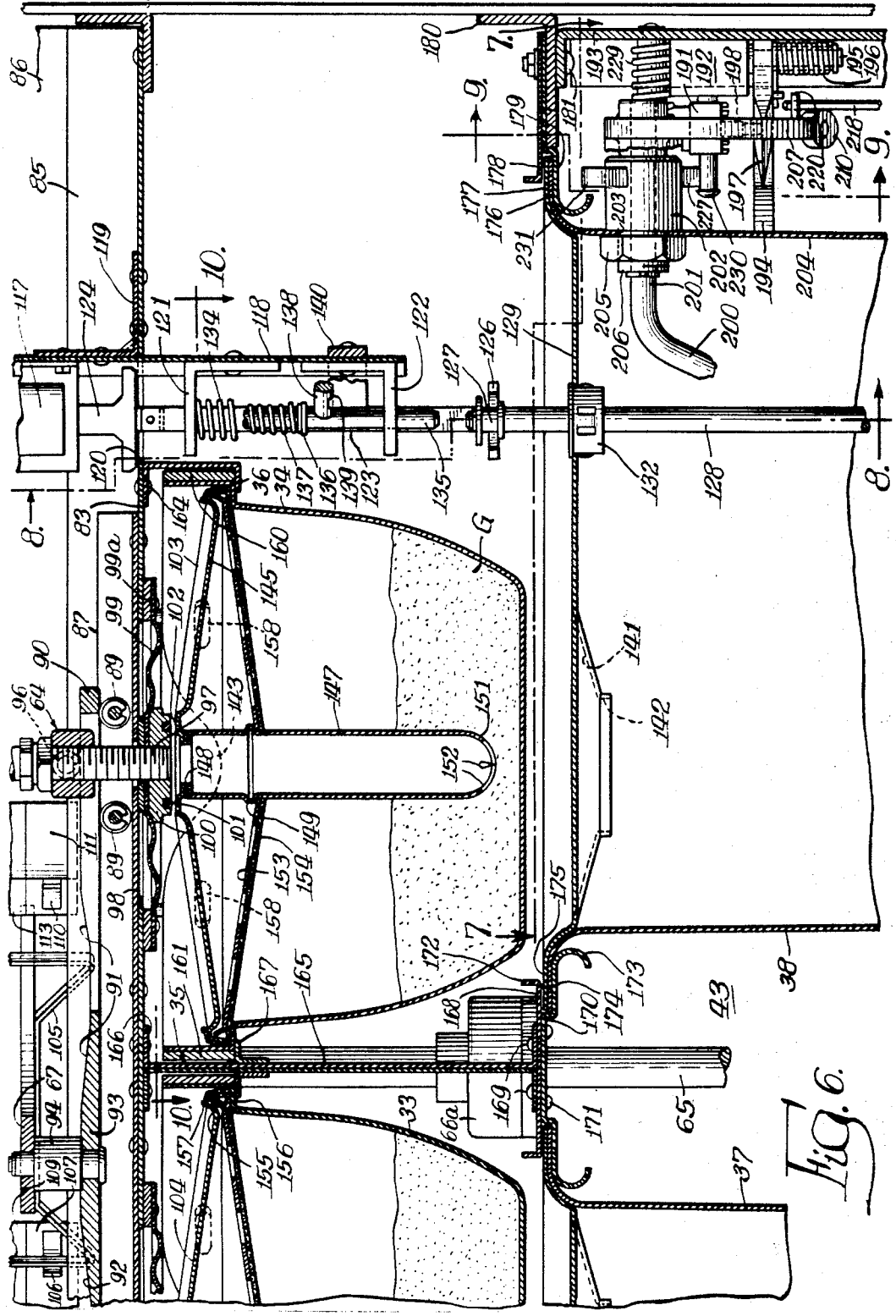

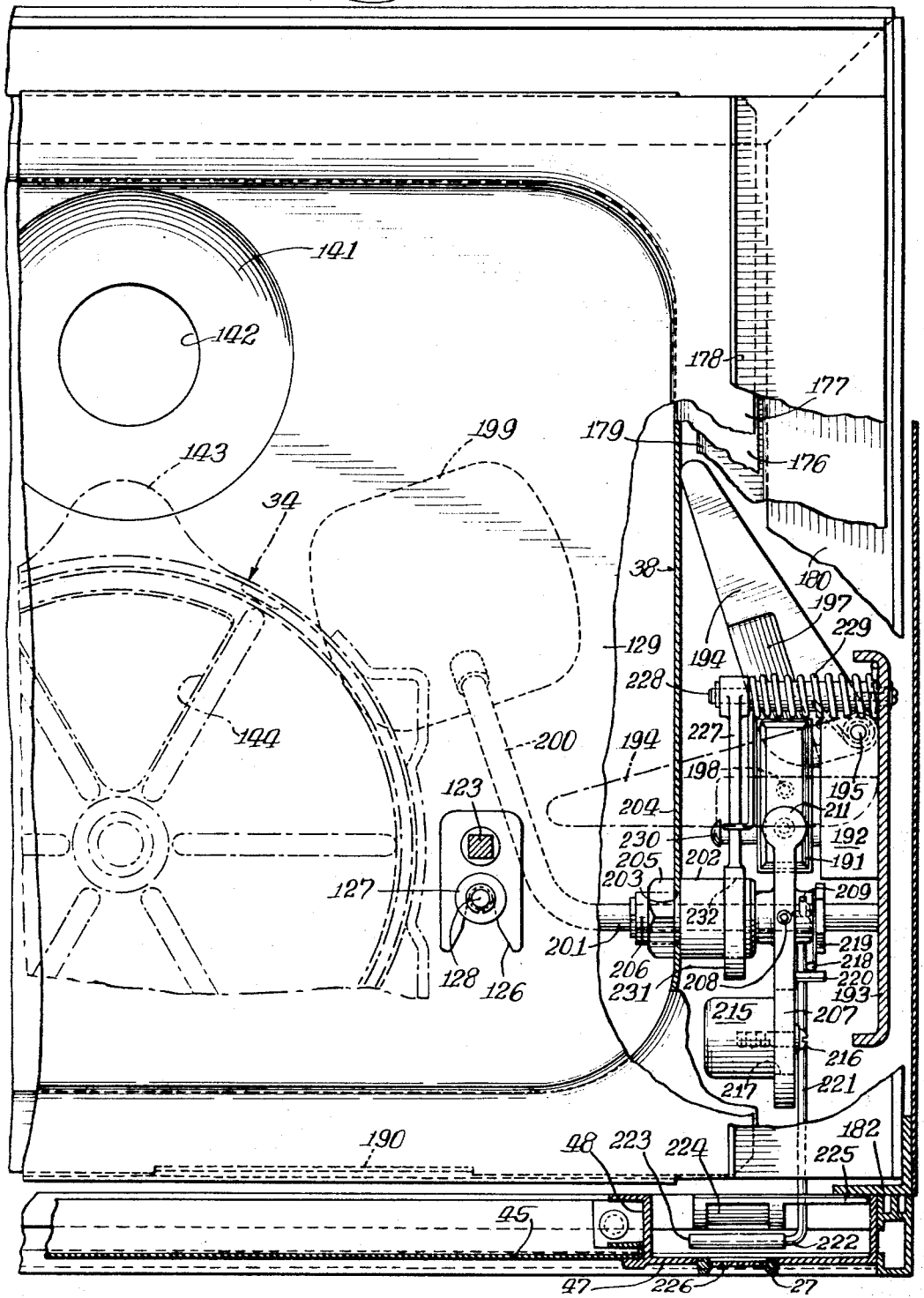

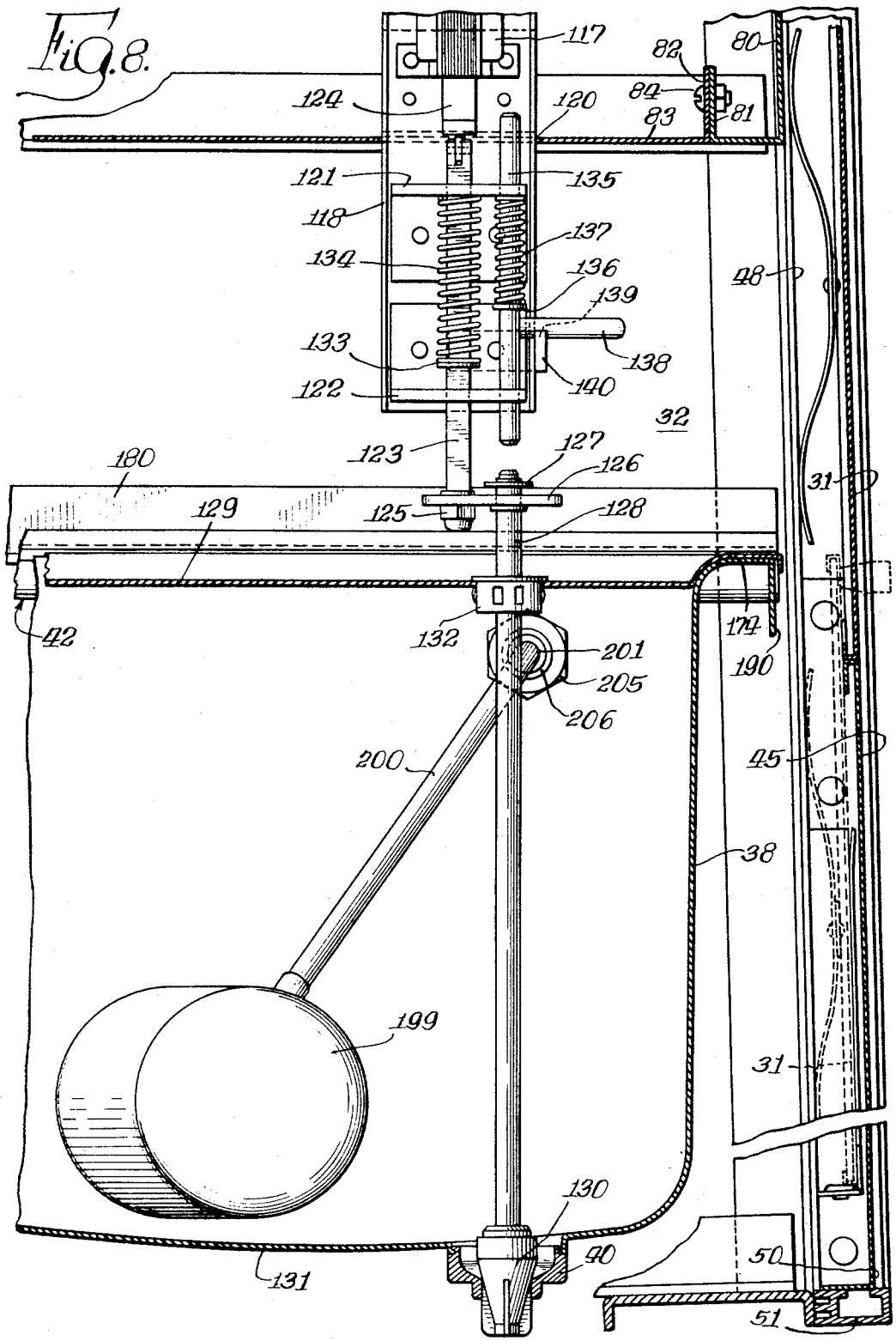

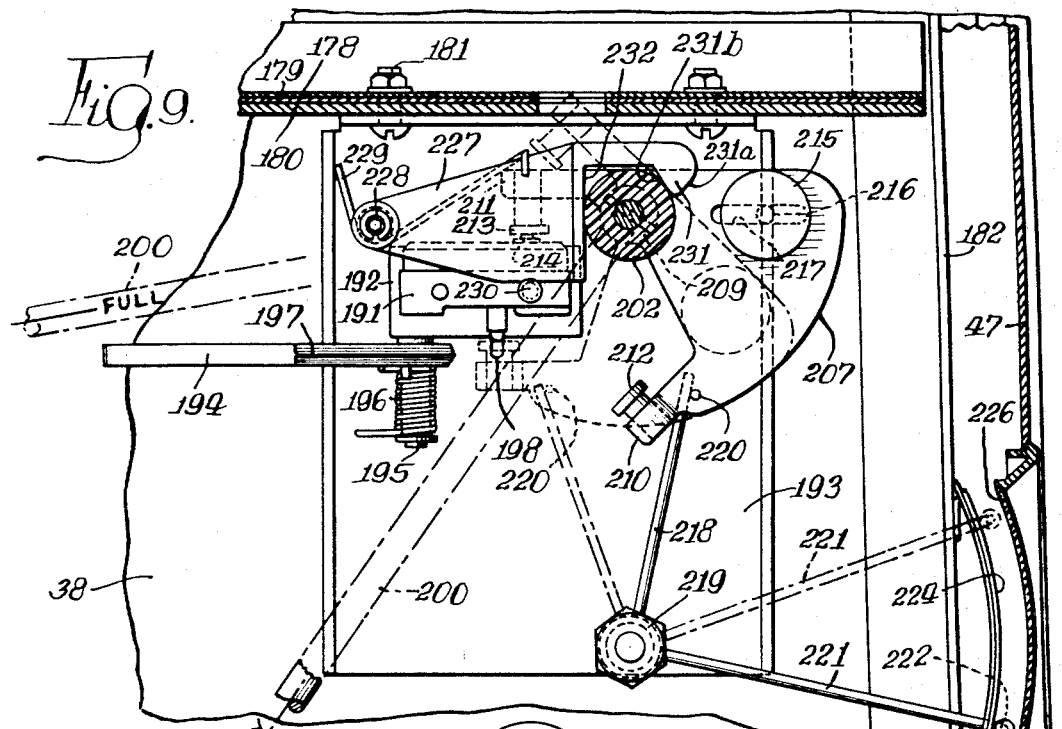
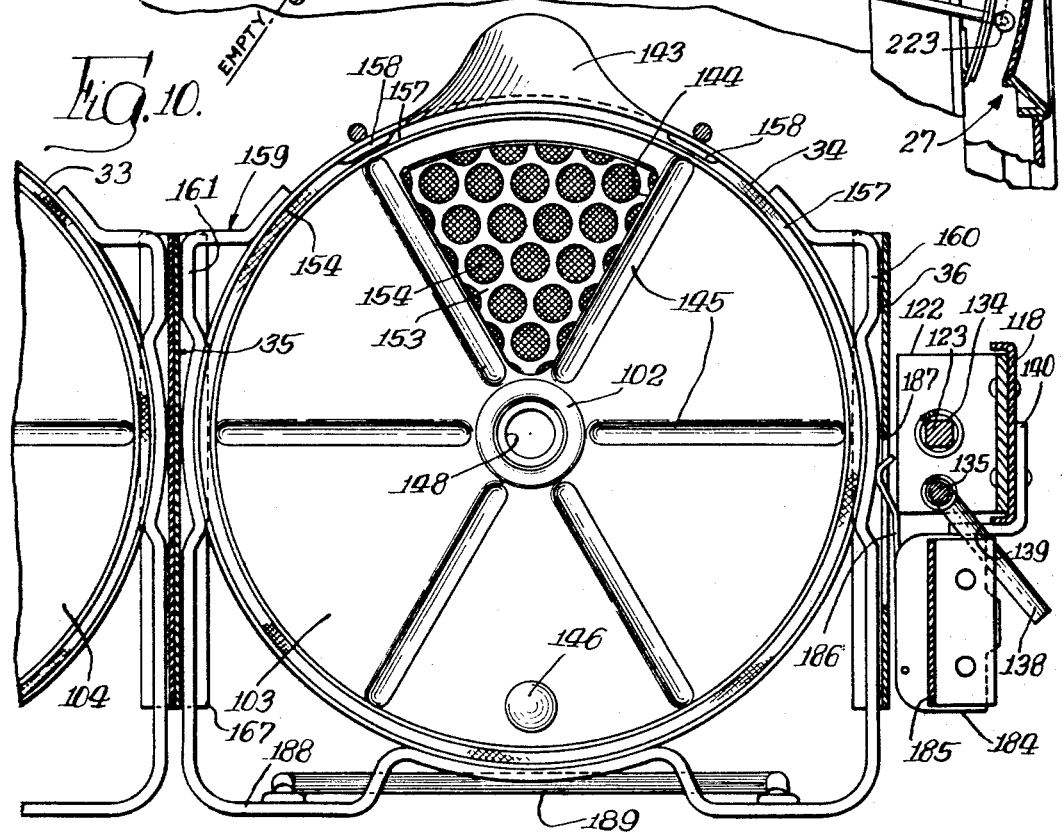

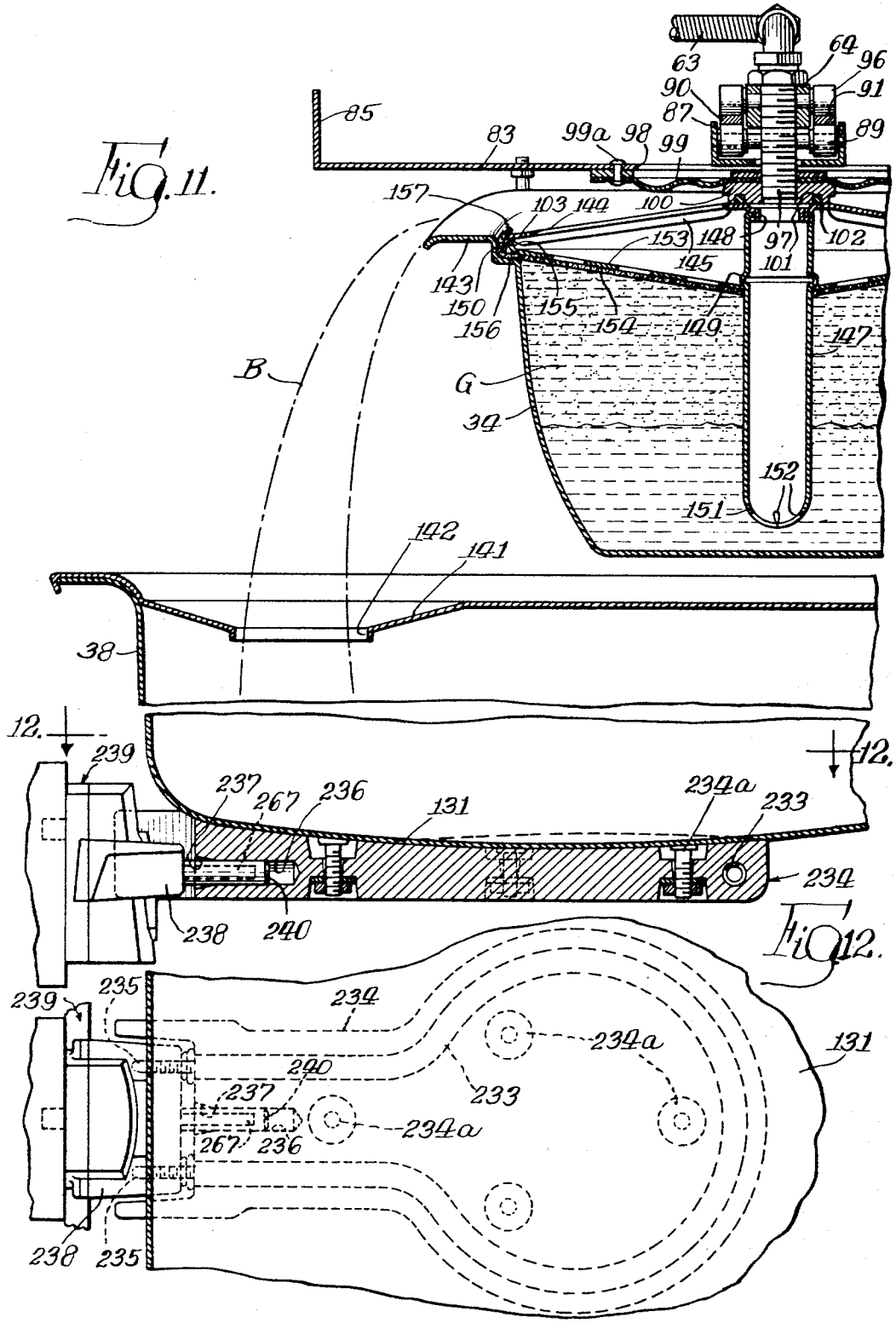

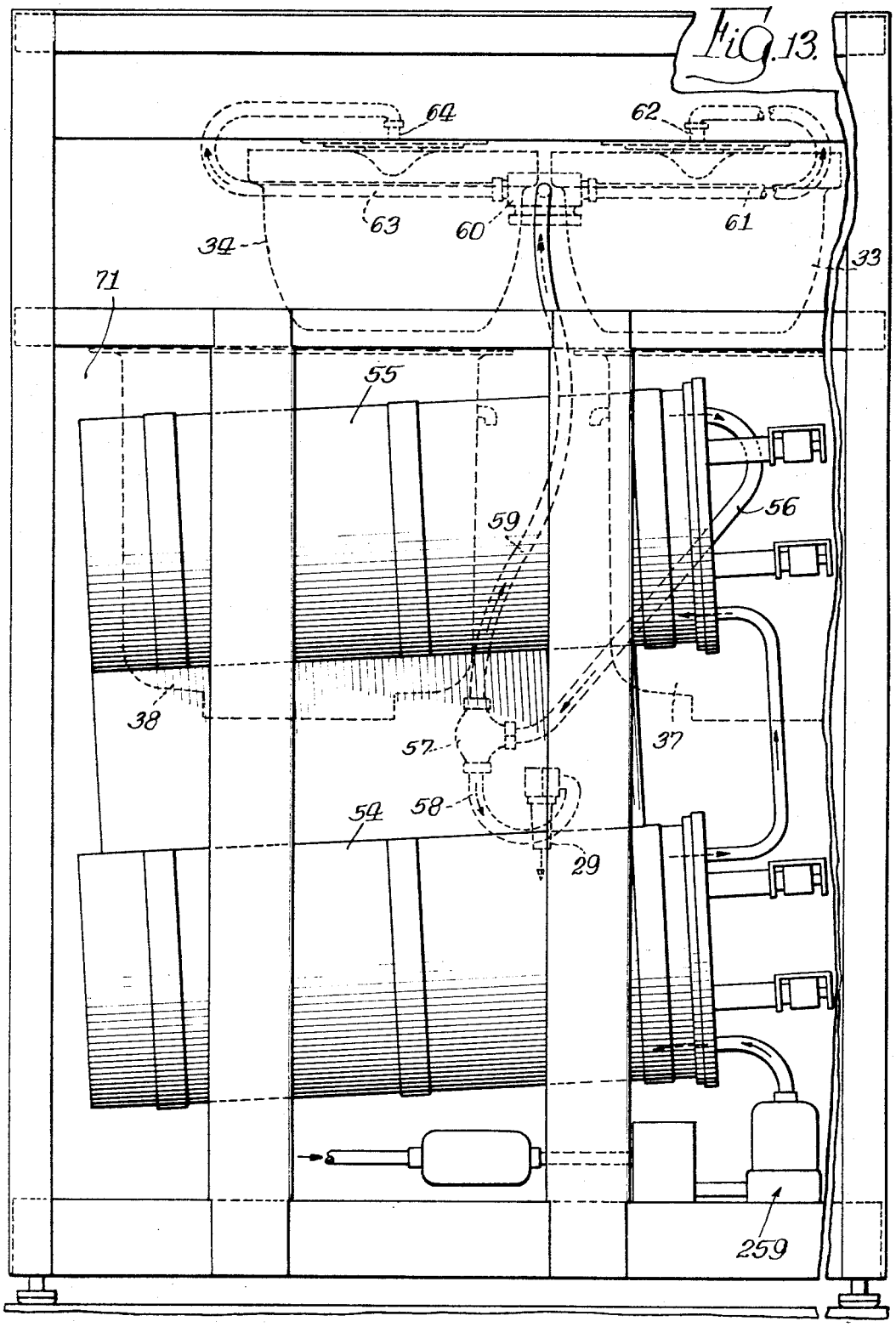

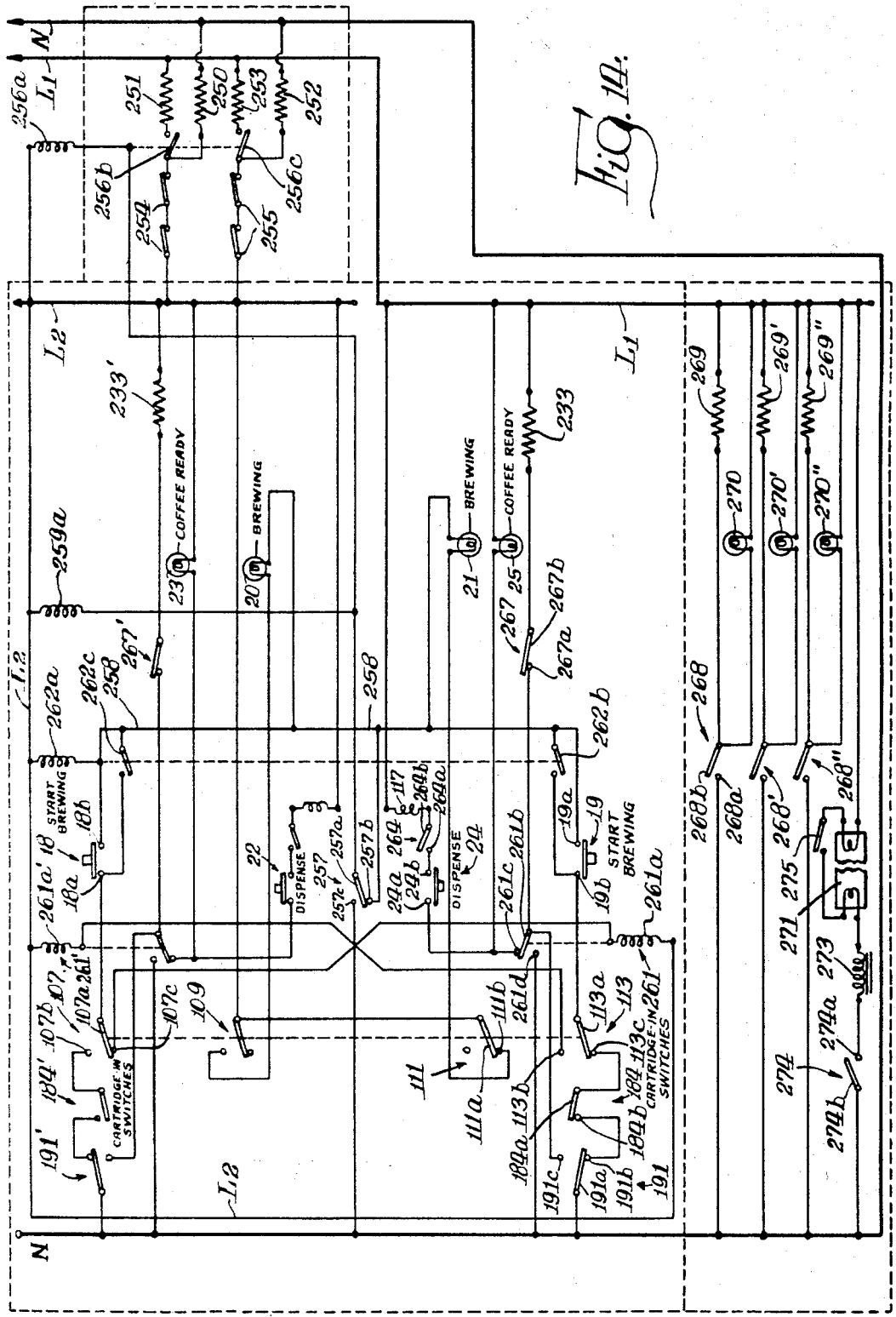

3,433,149
BREWING APPARATUS
Harvey R. Karlen and David C. Eisendrath, Chicago,
Ill., assignors to Cory Corporation, a corporation of
Delaware
Original application Dec. 31, 1962, Ser. No. 248,681, now
Patent No. 3,326,115, dated June 20, 1967. Divided and
this application Apr. 28, 1967, Ser. No. 634,653
U.S. Cl. 99—282                               25 Claims
Int. Cl. C12l 7/00, 7/02; A47g 19/14

ABSTRACT OF THE DISCLOSURE

An automatic brewing device for use in restaurants and the like having dual brewers and brew storage tanks with controls for selectively brewing in one brewer while the brew is being dispensed from the storage tank associated with the other brewer. The apparatus is enclosed in a housing which is arranged to permit facilitated front and top access to the apparatus as for servicing thereof. The brewer comprises a removable cartridge and means are provided for facilitating the sealing connection of the cartridge in the apparatus in the brewing arrangement. The control prevents brewing into a partially filled storage tank, prevents dispensing from the storage tank during brewing of fresh brew, prevents dispensing of brew from the storage tank when no receptacle is placed in position for receiving the brew therefrom, prevents attempted brewing when the cartridge is not properly installed in place as when the cartridge seal is released, prevents heating of an empty decanter in position for receiving the brew, maintains the brew in the tank at a desired temperature, and prevents heating of an empty storage tank. The hot water supply tank is an open top atmosphere type tank. The apparatus further includes removable valve means for controlling delivery of the brew from the storage tank.

---

This application comprises a division of our copending application Ser. No. 248,681, filed Dec. 31, 1962, now Patent No. 3,326,115, for a beverage brewing and dispensing apparatus.

This invention relates to brewing apparatus and in particular to apparatus for automatically brewing beverages such as coffee.

In restaurants and the like there is a need for automatic brewing apparatus for producing substantial quantities of beverages such as coffee with a minimum amount of personal attention and with minimum maintenance requirements. There are a substantial number of different types of brewing apparatuses presently in use in such applications. However, the known beverage brewing apparatuses have serious disadvantages in the requirements of substantial personal attention and substantial servicing and maintenance. The known apparatuses have further deficiencies in the lack of fully automatic operation and the possibility of malfunctioning resulting from improper utilization thereof. The personnel utilizing such brewing apparatuses often have limited technical knowledge and ability and further are often acting hurriedly and under pressure and fail to execute the necessary operations involved with the known apparatuses with the necessary degree of accuracy and control whereby the apparatuses often are damaged or caused to produce improperly brewed beverage.

Servicing of known brewing apparatuses is difficult as a result of the need in many cases of completely removing the apparatus in order to allow access to rearwardly arranged components and the like which are inaccessible from the front. Further, the disassembly of substantial portions of the apparatus is often necessary to service or replace parts thereof which from time to time require such maintenance. Still further, portions of the apparatus which do require replacement from time to time are often permanently associated with other portions which may not require such replacement and thus undesirable replacement costs are entailed in replacing the expendable parts. Thus, the known beverage brewing apparatuses have a substantial number of disadvantages whereby such apparatuses have not proved to be completely satisfactory for the intended use in restaurants and the like.

The present invention comprehends an improved beverage brewing apparatus which eliminates many of the above discussed disadvantages of the known apparatuses in a simple economical manner. Thus, a principal object of the present invention is the provision of a new and improved beverage brewing apparatus.

Another object of the invention is the provision of such beverage brewing apparatus having improved automatic operation.

A further object of the present invention is the provision of such beverage brewing apparatus arranged for improved facilitated automatic brewing of quantities of beverage such as coffee.

Still another object of the present invention is the provision of such an apparatus arranged for facilitated maintenance and servicing thereof.

A still further object of the invention is the provision of such apparatus having improved construction providing extended life and maintained quality of brewing.

Yet another object of the invention is the provision of such apparatus arranged for improved automatic operation effectively assuring optimum brewing of the beverage with effectively minimum personal servicing thereof.

Another object of the invention is the provision of such apparatus having improved control means for providing facilitated automatic operation for providing optimum beverage quality.

A further object of the invention is the provision of such apparatus which is simple and economical of construction yet which is capable of rigorous and continuous use producing substantial quantities of the beverage over an extended life.

Other features and advantages of the invention will be apparent from the following description taken in connection with the accompanying drawings wherein:

FIGURE 1 is a front elevation of a coffee brewer embodying the invention disposed on a support such as a portion of a cabinet;

FIGURE 2 is a front elevation thereof with the upper service door lowered as for servicing of the brewing cartridge;

FIGURE 3 is a fragmentary enlarged front elevation thereof with the front panels removed;

FIGURE 4 is a horizontal section thereof taken substantially along the line 4—4 of FIGURE 3;

FIGURE 5 is a vertical section thereof taken substantially along the line 5—5 of FIGURE 2;

FIGURE 6 is a fragmentary enlarged vertical section taken substantially along the line 6—6 of FIGURE 5;

FIGURE 7 is a fragmentary enlarged horizontal section taken substantially along the line 7—7 of FIGURE 6;

FIGURE 8 is a fragmentary enlarged vertical section taken substantially along the line 8—8 of FIGURE 6;

FIGURE 9 is a fragmentary enlarged vertical section taken substantially along the line 9—9 of FIGURE 6;

FIGURE 10 is a fragmentary horizontal section taken substantially along the line 10—10 of FIGURE 6;

FIGURE 11 is a fragmentary enlarged vertical section taken substantially along the line 11—11 of FIGURE 3;

FIGURE 12 is a fragmentary horizontal section taken substantially along the line 12—12 of FIGURE 11;

FIGURE 13 is a fragmentary enlarged rear elevation of the apparatus with the rear panel removed; and FIGURE 14 is a schematic electrical wiring diagram of the control circuitry thereof.

In the exemplary embodiment of the invention as disclosed in the drawing, a coffee brewing apparatus generally designated 10 is shown to comprise a cabinet 11 having a decanter fill station 12a arranged to carry a plurality of conventional decanters 13 below a coffee brewing portion 14. The coffee is brewed in portion 14 by suitable apparatus therein as will be discussed in detail subsequently and is delivered selectively through a first discharge opening 15 or a second discharge opening 16 into the subjacent decanters 13. The brewing of the coffee and delivery thereof to the selected decanter is controlled by a control shaft 17 which is selectively disposable in the left-hand position as shown in FIGURE 1 and in the right-hand position of FIGURE 2. A first "Start Brewing" push button 18 provides control of brewing of coffee for delivery through opening 15 and a second "Start Brewing" push button 19 provides control of brewing of coffee for delivery through opening 16. A "Brewing" signal light 20 is associated with push button 18 and a second "Brewing" signal light 21 is associated with push button 19 for indicating the brewing operation as will be discussed in greater detail subsequently. A "Dispense" push button 22 is provided for control of the dispensing of the coffee through opening 15. Indication that the brewing has been completed so that the coffee may be dispensed through opening 15 is indicated by a "Coffee Ready" signal light 23 directly above push button 22. A second "Dispense" push button 24 similarly controls the delivery of the coffee through the opening 16 and a second "Coffee Ready" signal light 25 is provided for indicating that the coffee is ready for such dispensing therethrough. A first indicator 26 is provided at the left side of the cabinet for indicating the quantity of coffee available for dispensing through opening 15 and a second indicator 27 is provided at the right side of the cabinet for indicating the quantity of coffee available for dispensing through opening 16. Control shaft 17 is provided at its outer end with a knob 28 permitting selective rotation of the control shaft about its longitudinal axis for effecting delivery of hot water through an outlet 29 extending downwardly through a third opening 30 whereby hot water may be delivered to a subjacent decanter 13' for use such as in making tea or other beverages.

Thus, in recapitulation, as seen in FIGURE 1, the brewing apparatus 10 is arranged to brew quantities of coffee and dispense the coffee selectively to decanters 13 disposed on the fill station portion 12a. The brewing and dispensing of the coffee is controlled by suitable push buttons accessible from the front of the apparatus. The functioning of the apparatus relative to the brewing of the coffee and the completion of the brewing so as to have the coffee available for dispensing is indicated by suitable signal means viewable from the front of the apparatus and the quantity of coffee remaining available for such dispensing is indicated to the user by suitable indicator means also readily viewable from the front of the apparatus.

Referring now to FIGURES 1 and 2, the brewing portion of the apparatus includes a movable door 31 which is disposable in a lower position (see FIGURE 2) to provide access to the upper space 32 of the brewing portion 14 of the cabinet 11 wherein is disposed a pair of brewing cartridges 33 and 34. The cartridges are slidably carried on pairs of tracks 35 and 36 so as to permit facilitated installation and removal relative to the upper space 32. Directly below the brewing cartridge 33 is a first storage tank 37 and directly below the second brewing cartridge 34 is a second storage tank 38. The brew is maintained in these storage tanks subsequent to the brewing thereof in the cartridges and is dispensed therefrom as desired through controlled outlets 39 and 40 in tanks 37 and 38 respectively to pass downwardly through the discharge openings 15 and 16 respectively to the subjacent decanters. The storage tanks are slidably carried on pairs of guides 41 and 42 to permit facilitated installation and removal of the storage tanks relative to a lower space 43 of brewing portion 14. Space 43 is made accessible by the removal of the cabinet front panel 44 which includes a midportion 45, fronting space 43, and a pair of side portions 46 and 47 having suitable openings therein for exposing the signal lights 20, 21, 23 and 25, push buttons 18, 19, 22 and 24 and indicators 26 and 27. The side portions further define vertical slides 48 in which the door 31 is guided and which cooperate with a pair of slide clips 49 for holding the upper portion of the panel 44 removably in position across the front of the cabinet portion 14. The lower edge 50 of the panel 44 is retained on a cross-frame member 51 for retaining the lower portion of the panel in position while permitting ready removal of the panel by slight upward movement thereof when the clips 49 are disengaged from the slides 48. The lower edge 50 is further provided with a downwardly opening slot 52 through which the control shaft 17 extends.

Referring now more specifically to FIGURE 5, the cabinet 11 further includes a rear portion 53 in which a pair of hot water tanks 54 and 55 are provided for delivering hot water through a first conduit 56 to a first two-way valve 57 from which the water is selectively delivered through a second conduit 58 to outlet 29 or through a third conduit 59 to a second two-way valve 60. The hot water is delivered selectively from the second valve 60 through a fourth conduit 61 to an inlet fitting 62 (see FIGURE 4) directly above cartridge 33 and through a fifth conduit 63 to an inlet fitting 64 directly above cartridge 34. The control shaft 17 is connected through an arcuate rod, or arm, 65 pivotally mounted in a pair of bushings 66a and 66b to linkage 67 connected to valve 60 for selectively positioning the valve to deliver water therethrough to either one of the two conduits 61 and 63. The control shaft 17 extends rotatably through a tubular fitting 68 comprising a lower portion of arcuate arm 65 and which is provided at its rear end with a coupling 69 connecting the shaft 17 through a flexible shaft 70 to the valve 57 for arranging the valve to direct the hot water selectively through conduits 58 and 59.

Cabinet 11 is provided with a partition 71 which defines a space 53 in the cabinet rearwardly of the upper space 32 and a forwardly open fill station space 72 above the fill stand 12. The partition 71 is provided with a first opening 73 through which shaft 70 extends and a second opening 74 through which the conduit 58 extends. An opening 75 is provided in the partition 71 in the upper portion thereof through which the conduit 59 extends. An L-shaped bracket 77 is secured to the upper end of partition 71 and includes a forwardly extending portion 78, valve 60 being secured to the underside thereof. The bracket is provided with a hole 76 aligned with hole 75 to pass conduit 59. Valve 60 includes an upright shaft 79 which extends through the bracket portion 78 and which is secured to the linkage 67 whereby the valve 60 is selectively operated by manipulation of control shaft 17 through arm 65. Cabinet 11 is further provided at its upper front portion with a rearwardly turned channel member 80 to which clips 24 are secured and having a rear, upturned flange 81 to which a front upturned flange 82 of a pan 83 is secured as by screws 84. The rear portion of the pan 83 defines an upturned flange 85 to which is secured an upstanding wall member 86 extending to the top of the cabinet 11. As shown in FIGURE 4, the pan 83 carries a track 87 having two pairs of roller devices 88 and 89 extending thereacross. A cam plate 90 rests slidably on the roller devices 88 and 89 for movement parallel to the direction of elongation of the channel. Conduits 61 and 63 pass through openings 86a and 86b respectively in the upstanding wall 86.

As best seen in FIGURE 6, the upper surface of the cam plate includes a pair of depressed portions 91 and 92 on opposite sides of a midportion 93. The midportion 93 is connected to the linkage 67 by means of a pivot 94 whereby manipulation of control shaft 17 moves the cam plate 90 selectively to the left or right as seen in FIGURE 4. Inlet fitting 62 includes a cam follower roller 95 which rides on the upper surface of the cam plate 90 adjacent depressed portion 92 and inlet fitting 64 includes a cam follower roller 96 which rides on the upper surface of the cam plate 90 adjacent depressed portion 91. Thus when the cam plate 90 is moved to the left as shown in FIGURES 4 and 6, roller 95 is lowered and roller 96 is raised. Inlet fitting 64 as shown in FIGURE 6 (and inlet fitting 62 which is identical thereto) includes an exteriorly threaded inlet tube 97 which extends downwardly through an opening 98 in the pan 83 and a metal spring diaphragm 99 secured to the under side of the pan, as by screws 99a. At its lower end, tube 97 carries a disc 100 having an annular seal 101 in its lower face. When follower 96 is elevated as shown in FIGURE 6 the disc 100 and seal 101 are raised against the action of spring diaphragm 99 to space the disc and seal slightly above an annular upper portion 102 of the top 103 of the brewing cartridge 34. When, however, the linkage 67 is operated to move cam plate 90 to the right as seen in FIGURE 4, the cam follower 96 moves downwardly into depressed portion 91 thereby allowing the disc 100 and seal 101 to move downwardly under the urging action of diaphragm 99 to sealingly engage the annular portion 102 of the cartridge top. Cartridge 33 includes a top 104 similar to top 103 arranged for selective sealing engagement by inlet fitting 62.

As best seen in FIGURE 4, linkage 67 further carries an actuator 105 which selectively engages an operating finger 106 of a first switch 107, and an operating finger 108 of a second switch 109 when the linkage 67 is in the clockwise extreme position of FIGURE 4, and a third operating finger 110 of a third switch 111 and a fourth operating finger 112 of a fourth switch 113 when the linkage 67 is in the counterclockwise extreme position opposite that of FIGURE 4. A first solenoid 114 is carried by a support plate 115 secured to a bracket 116 carried on the pan 83 and a second solenoid 117 is carried by a support plate 118 secured to a bracket 119 on the pan 83 at opposite ends of the track 87.

Referring now more specifically to FIGURES 3, 6 and 8, the support plate 118 extends downwardly through an opening 120 in pan 83 and carries a pair of vertically spaced bearing brackets 121 and 122 through which a rod 123 of square cross section slidably extends, the upper end of which is secured to the armature 124 of the solenoid 117. The lower end of the rod 123 is provided with a connector 125 carrying a bifurcated valve lifter 126 which engages a spool connector 127 fixed to the upper end of a valve rod 128 extending downwardly through a cover 129 of storage tank 38 and provided at its lower end with a valve member 130 selectively closing the outlet 40 in the bottom wall 131 of the tank 38. The rod slides vertically in a bushing 132 removably fixed in the cover 129 and having a large diameter permitting movement of valve 130 upwardly through cover 129 to remove the valve from apparatus 10 as for servicing the valve.

For biasing valve member 130 to the closed position in outlet 40, a collar 133 is secured to rod 123 between bracket 121 and collar 133 thereby urging the rod 123 about the rod to extend under compression between the bracket 121 and collar 13 thereby urging the rod 123 downwardly. Thus, when solenoid 117 is deenergized, spring 134 causes the rod 123 to urge the valve lifter 126 downwardly and cause the valve member 130 to seat closingly in outlet 40. When solenoid 117 is energized, armature 124 is raised against the action of spring 134 thereby raising the valve lifter 126 and rod 128 to move the valve member 130 upwardly from the outlet 40 and allow the stored brew to pass from tank 38 downwardly through discharge opening 16 into the subjacent decanter 13.

Should for some reason valve rod 128 fail to move downwardly when it is desired to close the outlet 40, such as if the solenoid armature 124 should hang up, a flooding of the fill station may occur. To preclude this, means are provided to positively urge the valve rod downwardly to close the outlet 40. Herein, an emergency actuating rod 135 extends slidably through the brackets 121 and 122 above and in axial alignment with the valve rod 128. Intermediate brackets 121 and 122, the actuating rod 135 is provided with a collar 136 and a coil spring 137 extends under compression between bracket 121 and the collar 136 to urge the rod 135 forcibly downwardly. The rod 135 is normally retained in an upper position by a lever portion 138 which extends radially outwardly from the rod subjacent the collar 136 and which is normally held in a groove 139 in a catch 140 secured to the support plate 118. As shown in FIGURE 3, the lever 138 is accessible from the front of the cabinet 11 when the door 31 is lowered. Thus, should the valve member 130 for some reason be maintained above the outlet 40 when it is desired that the outlet be closed, the operator may quickly lower the door 31 and pull the lever 138 leftwardly as seen in FIGURE 3 to disengage the lever from catch 140 and allow rod 135 to move downwardly and force the valve rod 128 downwardly to seat the valve member 130 in the outlet 40.

As shown in FIGURE 3, the means for controlling the flow of beverage from tank 37 is identical to the means for controlling the flow from the tank 38. Thus, the description set forth above applies equally to each control means.

As indicated briefly above, the storage tank 38 is provided with a cover 129. The cover in addition to carrying the bushing 132 is provided with a depressed portion 141 defining an inlet opening 142 for receiving brew from the cartridge 34. As shown in FIGURE 11, and in dot-dash lines in FIGURE 7, the cartridge 34 includes a rearward spout portion 143 arranged to deliver the brew B downwardly from the cartridge through the opening 142 into tank 38. Cover 103 of cartridge 34 is provided with an opening 144 through which the brew passes from the cartridge to spout 143. As best seen in FIGURE 10, cover 103 is provided with a plurality of stiffening ribs 145 extending radially outwardly from the annular sealing portion 102 and a handle 146 is secured to the front portion of the cover opposite the outlet opening 144. The cover is concave opening downwardly as seen in FIGURE 11 and a tubular stem 147 is secured to the cover to extend downwardly therefrom in coaxial alignment with cover opening 148. Stem 147 is provided with an annular enlargement 149 adjacent its upper end, and is provided with a closed lower end 151 having a plurality of thin slots 152 outwardly through which the incoming hot water passes from the stem into the cartridge 34.

A concave, upwardly opening foraminous screen 153 is arranged about the stem 147 and a filter cloth 154 is mounted on the screen to extend therebelow across the top of the cartridge 34 to filter the brew B as it passes upwardly from the cartridge to the outlet 144 and thence through spout 143 to the tank 38. The screen is provided with an upturned peripheral flange 155 which rests on a large portion 156 of the cartridge. The edge portion 150 of the cover engages the ledge 156 outwardly of the screen edge 155 and thereby urges the screen against the peripheral edge of the filter to seal the upper portion of the cartridge at the ledge 156. The filter preferably is provided with an elastic element 157 extending circumferentially thereabout whereby the filter may be drawn around the edge 150 of the cover. As best seen in FIGURE 10, the cartridge is provided with a pair of tabs 158 on opposite sides of the spout 143 under which the edge 150 of the cover 104 is retained and cooperates with handle 146 which, as shown in FIGURE 5, bears against pan 83 to secure the cover against movement upwardly from the cartridge as by a pressure built up within the cartridge during the brewing of the brew therein.

As shown in FIGURES 3, 6 and 10, the cartridge 34 is provided with a U-shaped bracket generally designated 159 having legs 160 and 161 defining slides slidably received in the opposed tracks 35 and 36. Channel 36 comprises a U-section member secured to the underside of pan 83 by suitable means such as screws 164. Channel 35 includes a wide-web U-section member 165 secured to the underside of pan 83 as by screws 166 and having secured thereto as by spot welding an angular clip 167 on which slide 161 slides. An upper plate 168 is secured to the bottom of the U-shaped member 165 as by screws 169 and a lower plate 170 is secured to the underside of upper plate 168 by suitable means such as screws 171. The longitudinal edges 172 of upper plate 168 are upturned and the longitudinal edges 173 of the lower plate 170 are downturned to define the slide track in which the outturned upper edge 174 of the storage tank 38 and the lateral edge 175 of the cover 129 of storage tank 38 are slidingly received to support the storage tank in place below cartridge 34 as shown in FIGURE 6. The opposite outturned edge 176 of the storage tank 38 and lateral edge 177 of cover 129 are slidably carried in a corresponding upper plate 178 and lower plate 179 secured by means such as screws 181 to a horizontal angle 180 welded at its front end to upright front corner angle 182 and at its rear end to a corresponding rear corner angle 183 (see FIGURE 4).

In controlling the operation of the brewing apparatus 10, it is desirable to prevent delivery of water through inlet 64 when cartridge 34 and brewing tank 38 are not installed. To this end, a snap action switch 184 (see FIGURES 3 and 10) is secured to the underside of pan 83 by a Z-shaped bracket 185 and includes a spring actuating finger 186 which extends through a slot 187 in slide bracket 36 to be engaged by the leg 160 of cartridge 34 when the cartridge is installed. As shown in FIGURES 2 and 10, the bracket 159 includes a bight portion 188 from which a U-shaped handle 189 depends for facilitated movement of the cartridge into and from the channel members 35 and 36.

Storage tank 38 is manipulated into and from cabinet 11 on the tracks 172–173 and 178–179 by means of a handle 190 depending from the front of the outturned edge 174 of the storage tank. As shown in FIGURE 6, a single pole double throw snap action reset toggle switch 191 is mounted on a block 192 secured to a depending plate 193 secured to the underside of bracket 180 by the mounting screws 181. An operating arm 194 is pivotally carried on a vertical rod 195 and a coil spring 196 on rod 195 biases the arm 194 to extend into the path of movement of the storage tank 38 as it is moved into the cabinet 11, as best seen in FIGURE 7. Arm 194 is provided with a cam surface 197 bearing against a depending plunger 198 of switch 191 to actuate the switch as a result of the pivotal movement thereof to the dotted line position shown in FIGURE 7 in the absence of the tank 38.

To provide further control of the operation of brewing apparatus 10 as a function of the absence or presence of brew in the storage tanks 37 and 38, each storage tank is further provided with a float 199 carried on an arm 200 having a turned end portion 201 extending through a plastic bearing 202 passed through an opening 203 in the side wall 204 of the tank 38 as shown in FIGURE 6. The bearing is secured to the side wall by a nut 205 threaded to a reduced diameter threaded portion 206 of the bearing extending to within the storage tank 38. As shown in FIGURES 7 and 9, a bracket 207 is secured to the distal end of the arm portion 201 by a screw 208 and a locating pin 209. The bracket 207 is provided with a pair of projecting arms 210 and 211 carrying respectively a pair of adjustable actuators 212 and 213. Actuator 213 is arranged to engage an upper plunger 214 of switch 191 when the bracket is pivoted to the extreme counterclockwise position thereof as shown in FIGURE 9 (in which position the bracket is disposed when the float 199 is at the bottom of the storage tank 38 as when the storage tank is empty). Alternatively, bracket 207 is positioned as shown in dotted lines in FIGURE 9, with the actuator 212 engaging and raising the plunger 198 when the float is in an uppermost position as when the storage tank is full.

The bracket 207 is further provided with a counterweight 215 which is adjustably secured thereto by a screw 216 extending through an elongated slot 217 whereby the control arm of the counterweight relative to the axis of arm piston 201 may be adjusted thereby to adjust the effective counterbalancing effect.

Float 199 is further utilized in apparatus 10 to provide an automatic indication at all times of the quantity of beverage in the storage tank 38. For this purpose, a wire finger 218 is pivotally mounted on a pivot 219 fixed to the lower end of plate 193. The finger 218 extends into the path of movement of a pin 220 extending horizontally from arm 210 of bracket 207. The finger 218 is provided with an angular extension 221 extending forwardly (or toward the front of the cabinet) from the pivot 219 and having a horizontally turned distal end 222 on which may be mounted a plastic sleeve 223 of a suitably bright color, such as red. The finger end 222 and sleeve 223 thereon extend horizontally in front of an "Empty-Full" indicator plate 224 of indicator 27, the indicator plate being secured to the front corner angle 182 by suitable bracket 225 (see FIGURE 3). Thus, when the arm 200 is positioned as shown in FIGURES 8 and 9 with the float at the bottom of the storage tank 38, the pin 220 permits the arm extension 221 to pivot to the lowermost position thereof indicating that the storage tank is empty. However, when the float rises in the storage tank to reposition the arm 200 to the upper position shown in broken lines in FIGURE 9, the pin 220 moves clockwise to pivot the finger 218 counterclockwise and thus raise the finger extension 21 to the uppermost position as shown in broken lines therein. As shown in FIGURE 9, the position of the sleeve 223 relative to the indicator plate 224 is observable through a transparent plastic window 226 of the indicator 27 installed in the front panel side portion 47.

To assure a proper disposition of the storage tank 38 when installed in the cabinet 11, to accurately locate the pin 220 for causing finger 218 to position the sleeve 223 in correspondence with the liquid level in the storage tank, a latch 227 is pivotally mounted on a post 228 carried by plate 193. The latch is biased by a coil spring 229 in a clockwise direction as shown in FIGURE 9 against a stop 230 carried on switch 191. The forward portion 231 of the latch includes a front slanted surface 231a engaged by the outwardly projecting cylindrical bearing 202 on the tank 38 to pivot the latch upwardly against the action of spring 229 as the tank is moved into position in the cabinet 11, permitting the bearing to move rearwardly until it abuts a vertical surface 232 of the latch whereupon the forward portion 231 drops downwardly to releasably retain the bearing in the rearmost position. The rearwardly slanted surface 231b defining the rear of latch portion 231 permits the forward movement of the storage tank when desired by camming the latch upwardly.

The brew in the storage tank 38 is heated by means of an electrical heater 233 carried in a cast aluminum block 234 on bottom wall 131 of the storage tank. As shown in FIGURE 12, the block 234 is secured to the underside of the tank bottom wall 131 by screw devices 234a. Heater 233 includes a pair of rearwardly projecting terminals 235. Block 234 is provided with a rearwardly opening recess 236 having a flared entrance 237. A female connector 238 is carried on a slide mounting 239 which permtis vertical and horizontal adjustment of the position of the female connector on the rear partition 71. A guide post 240 having a thermal sensing element 267 therein projects forwardly from connector 238 to be received in the recess 236 when the storage tank 38 is fully inserted into the cabinet 11 as shown in FIGURES 11 and 12 and sense the temperature of the block 234 and thus the temperature of the brew in the tank. Should the recess 236 be somewhat disaligned with post 240 as the block 234 moves rearwardly the flared entrance 237 of recess 236 moves the post 240 transversely thereby bringing the terminals 235 into accurate alignment with the female connector 238 and assuring a good electrical and thermal connection therebetween.

Referring now to the schematic electrical diagram of FIGURE 14, the operation of the brewing apparatus 10 may best be seen. As shown in FIGURE 14, power is delievered to the apparatus 10 from a conventional 115/230 volt 60 cycle three wire power supply source including a neutral lead N and hot leads $L_1$ and $L_2$, the voltage between either of leads $L_1$ and $L_2$ to the neutral lead herein being 115 volts and the voltage between leads $L_1$ and $L_2$ being 230 volts. Hot water tank 54 is heated by means of a low wattage electrical heater 250 and a high wattage heater 251. Hot water tank 55 is heated by a corresponding low wattage heater 252 and a high wattage heater 253. The low wattage heater 250 is connected in series with a pair of normally closed thermostat switches 254 between lead $L_2$ and N. Low wattage heater 252 is connected in series with a pair of thermostat switches 255 between leads $L_2$ and N. Thus, whenever the water in the hot water tanks 54 and 55 is below a preselected temperature, the switches 254 and 255 are closed and the low wattage heaters heat the water at a relatively low rate. Illustratively, heaters 250 and 252 may be 88 watt heaters.

The energization of high wattage heater 251 is controlled by a normally open relay switch 256b and the energization of high wattage heater 253 is controlled by a normally open relay switch 256c, the switches 256b and 256c being closed by energization of an associated relay coil 256a connected between lead $L_2$ and the moving contact 257a of a manually operable single pole double throw "Hot Water Dispense" switch 257. The moving contact 257a of switch 257 is selectively closed with a fixed contact 257b thereof which is connected to a conductor 258. A normally open fixed contact 257c of switch 257 is connected to power supply lead N. Thus, when the switch 257 is operated to close contact 257a with fixed contact 257c, a circuit is established through relay coil 256a from lead $L_2$ to lead N thereby closing switches 256b and 256c.

Delivery of cold water to the hot water tanks 54 and 55 is controlled by a solenoid operated valve 259 having a solenoid coil 259a connected between moving contact 257a and power supply lead $L_2$, in parallel with relay coil 256a. Thus, the closing of contact 257a with contact 257c also energizes coil 259a to operate valve 259 and thereby admit cold water to tanks 54 and 55 whereby hot water is delivered from the tanks to two-way valve 57.

In the event that the water in either of tanks 54 or 55 is below a preselected minimum brewing temperature, the associated switches 254 or 255 will be closed and thus the associated high wattage heater 251 or 253 will be energized between leads $L_2$ and $L_2$ for providing a high heat delivery to the hot water tanks. In the illustrated embodiment, the high wattage heaters 251 and 253 are conventional 4500 watt heaters.

Herein, as shown in FIGURE 5, switch 257 is actuated by rotation of control shaft 17 carried in control arm 65 to urge an activator 70a carried on the end of shaft extension 70 against an operator 257d of switch 257 thereby to effect the desired energization of the relay coil 256a (see FIGURE 14). As indicated previously, the rotation of control shaft 17 also operates valve 57 to conduct hot water through conduit 58 to the hot water outlet 29 for delivering the hot water to a subjacent decanter 13 as shown in dotted lines in FIGURE 1. This operation of the switch 257 and valve 57 may be effected with the control arm 65 in any position relative to the slot 52.

The operation of the brewing apparatus 10 is as follows. Assuming that brew is to be brewed in the right side portion of the apparatus, it is first necessary to charge the cartridge 34 with brewing ingredient, such as ground coffee G, and to install the cartridge in the apparatus as shown in FIGURE 2. Further, it is necessary to have the storage tank 38 installed in the apparatus as shown in FIGURE 2 subjacent the cartridge 34 in place to receive the brew delivered from the cartridge during the brewing cycle. The control arm 65 is positioned in the right-hand position as shown in FIGURE 2. The right-hand "Start Brewing" push button 19 is then depressed.

"Start Brewing" pushbutton 19 comprises a normally open switch having one fixed contact 19a connected to conductor 258 and a second fixed contact 19b connected to the moving contact 113a of the switch 113. Switch 113 includes a first fixed contact 113b connected to the coil 261a' of a control relay 261' connected to power supply lead $L_2$. A second fixed contact 113c of switch 113 is connected to the moving contact 184a of the single pole single throw cartridge switch 184 and the fixed contact 184b of cartridge switch 184 is connected to the "Empty" fixed contact 191b of the float switch 191. Moving contact 191a of the float switch 191 is connected to power supply lead N to complete this portion of the circuit from conductor 258 to lead N.

As shown in FIGURE 14, a brew relay coil 262a is connected from conductor 258 to lead $L_2$. Assuming that (a) the float 199 is down so that moving contact 191a of switch 191 is closed with fixed contact 191b, (b) cartridge 34 is installed so that moving contact 184a is closed with fixed contact 184b, and (c) control arm 65 is installed in the right-hand position as shown in FIGURE 2, the closing of "Start Brewing" switch 19 energizes relay coil 262a thereby closing an associated first normally open switch 262b across push button contacts 19b and 19a of switch 19 and thereby providing a holding circuit to maintain the coil 262a continuously energized. As shown, coil 262a further closes a second switch 262c which is connected across the fixed contacts 18a and 18b of the left-hand "Start Brewing" switch 18. However, at this time a second valve lever switch 107 has its moving contact 107a connected to fixed contact 107c and spaced from fixed contact 107b of switch 107 to break the circut to switch 18 from power supply lead N.

When conductor 258 is thusly connected to lead N, the "Brewing" signal light 21 is energized as it is connected from conductor 258 to a fixed contact 111b of switch 111 also having a moving contact 111a connected to power supply lead $L_2$. When energy is applied to conductor 258, fixed contact 257b of switch 257 is energized, whereby current is delivered through moving contact 257a to solenoid coil 259a, the energization of which as discussed above, causes entry of cold water into the hot water tanks and the resultant delivery of hot water to the cartridge 34 through inlet 64 (at this time, the disposition of the control arm 65 is such as to arrange linkage 67 to open valve 60 to deliver the hot water from conduit 59 through conduit 63 to the right-hand cartridge inlet 64).

Referring now to FIGURE 11, the hot water passes from inlet 64 downwardly through the stem 147 into the cartridge 34 to pass through the brewing ingredient G and thereby the brew therein. After a sufficient quantity of hot water is delivered to the cartridge, the level of brew rises above the filter 154 to the level of the outlet spout 143 whereupon the brew flows downwardly from the spout as beverage B and through opening 142 into the subjacent storage tank 38. The switch 191 remains with moving contact 191a engaging fixed contact 191b until the level of brew in the storage tank 38 rises to the preselected full level, whereupon float 199 throws snap action switch 191 to close moving contact 191a thereof with fixed contact 191c. Fixed contact 191c is connected to moving contact 261b of relay 261. As shown in FIGURE 14, the holding heater relay 261 is deenergized at this time so that moving contact 261b is in contact with the first fixed contact 261c of the relay which is connected to a fixed contact 24a of the brew "Dispense" normally open push button switch 24.

Normally, the switch 191 will not effect energization of heater 233 until such time as the switch 191 snaps to the position wherein its moving contact 191a closes with its fixed contact 191c, as when the storage tank is full. Thus, the heater 233 would not be energized during the time that brew is being delivered to the storage tank. However, it is desirable to heat the brew during this time and to this end, a circuit is established by means of relay switch 261 closing moving contact 261b onto fixed contact 261d which is connected to power supply lead N. Coil 261a is connected between power supply lead $L_2$ and contact 107c of switch 107, to contact 18a of switch 18, and through switch 262c which is now closed by virtue of the energization of coil 262a to lead 258. The circuit continues from lead 258 through closed switch 262b to contact 19b, moving contact 113a, fixed contact 113c, moving contact 184a, fixed contact 184b, fixed contact 191b, and moving contact 191a which is connected to power supply lead N.

The other fixed contact 24b of the push button switch 24 is connected to a fixed contact 264a of a "Decanter-In" switch 264 having its moving contact 264b connected to the solenoid 117 which is in turn connected to the power supply lead $L_1$. The decanter switch 264, as shown in FIGURE 5, is mounted on the splash plate 265 rearwardly of the position of decanter 13 on the fill stand 12 and includes an actuator 266 projecting through the splash plate to be engaged by the decanter, when it is in place on the fill stand, thereby closing switch 264. Fixed contact 261c of relay 261 is connected to the "Coffee Ready" light 25 which is in turn connected to power supply lead $L_1$ and which is thusly energized at this time. Contact 191c of switch 191 is further connected to a fixed contact 267a of the thermostat switch 267 having its moving contact 267b connected to storage tank heater 233, the heater in turn being connected to power supply lead $L_1$. Thus, when the user presses the "Dispense" push button switch 24 to close the circuit from power supply lead N through solenoid 117, the valve 130 is raised permitting brew to pour from the discharge outlet 40 into the decanter 13. Should decanter 13 be inadvertently removed while the brew "dispense" push button 24 is depressed, the opening of switch 264 immediately deenergizes the solenoid 117 and prevents brew from being spilled onto the stand 12. Alternatively, if the user pushes push button 24 prior to the placement of the decanter 13 on the fill stand 12, solenoid 117 cannot be energized thereby precluding the delivery of brew onto the stand until such time as the decanter is properly placed thereon.

As shown in FIGURES 5 and 14, a decanter weight switch 268 is disposed below the fill station 12a and has a fixed contact 268a connected to power supply lead N and a moving contact 268b connected to a decanter warmer heater 269 in station 12a and which is in turn connected to power supply lead $L_1$. A decanter warmer light 270 (see FIGURES 2 and 14) is connected from moving contact 268 to power supply lead $L_1$ in parallel with heater 269. Switch 268 is a weight sensitive switch arranged so that the switch remains open until a weight at least equal to a partially filled decanter is in place on fill stand 12. Thus, prior to the time that brew is delivered into the decanter 13, the switch 268 remains open. In the illustrated embodiment, the decanter warmer heaters may be conventional 125 watt heaters arranged for operation on 115 volt alternating current. The left-hand fill stand 12' has a signal light 270' associated therewith and the central fill stand 12" has a signal light 270" associated therewith, each similar to signal light 270 of fill stand 12. Further, as shown in FIGURE 14, the fill stands 12' and 12" have switches 268' and 268" respectively associated therewith for controlling the signal lights 270' and 270" as well as associated decanter warmer heaters 269' and 269".

As shown in FIGURE 5, a fluorescent lamp 271 is secured to the top of the splash plate 265 to illuminate the fill stand space 72. A light diffusing translucent plate 272 is disposed below the lamp 271. As shown in FIGURE 14, one end of the lamp 271 is connected to a ballast 273 which is in turn connected to a fixed contact 274a of a light switch 274 having its moving contact 274b connected to power supply lead N. A starter switch 275 is connected across the fluorescent lamp 271 in the conventional manner. The other end of the lamp is connected to power supply lead $L_1$. As shown in FIGURE 3, switch 274 is carried on a housing 276, in which the signal lights 21 and 25 and push buttons 19 and 24 are mounted, for ready access when the front door 31 is lowered.

As shown in FIGURES 4 and 5, the control relays may be carried on a pair of support brackets 277 and 278 for facilitated servicing from the top of the cabinet 11.

During the brewing cycle described above wherein the right-hand cartridge 34 is utilized to deliver brew to the right-hand storage tank 38, or at any other time when the control arm 65 is in the center or right-hand position relative to slot 52, the cartridge 33 being then disconnected from the water inlet thereto by action of cam plate 90 permitting the cartridge to be readily removed for servicing. Thus, the cartridge may be removed from the apparatus 10 and suitable provided with fresh brewing ingredient. Upon reinstallation of the cartridge, and providing that the left-hand tank 37 is fully in place and that the float is in the empty position having actuated switch 191' to close power supply lead N into the fixed contact of cartridge-in switch 184', the left-hand portion of the apparatus is set up for brewing upon a manipulation of the control arm 65 to the left-most position as shown in FIGURE 1. To effect this brewing operation, the user merely depresses "Start Brewing" push button 18. The operation of the left-hand portion of the apparatus is identical to the operation of the right-hand portion as described above, and as indicated above, the control elements of the left-hand portion are similar to those of the right-hand portion and are identified on the wiring diagram 14 by similar numbers except for the prime suffixes.

As indicated briefly above, when it is desired to deliver hot water from outlet 29 to decanter 13' in fill stand 12", the operator merely rotates knob 28 to concurrently operate switch 257 and valve 57. This can be done at any time whether or not brew is being brewed in either of the cartridges. This connects valve solenoids 259a and relay switch coil 256a across power supply leads N and $L_2$ thereby continuing the delivery of water from the hot water tanks 54 and 55 and maintaining the heating of the tanks by the high wattage heaters 251 and 253. At the same time, the rotation of the knob 28 acts through shaft 17 to rotate the selector valve 57 and direct the hot water through conduit 58 to the outlet 29 rather than to the selected cartridge. Thus, the brewing of the brew is automatically interrupted until such time as the delivery of the hot water through outlet 29 is stopped by release of the control knob 28 permitting the valve 57 to return automatically where the valve 57 is of a conventional spring biased type to the position wherein the hot water is once again delivered through conduit 59 to valve 60 for redelivery to the selected cartridge. As the control of the brewing is effected by the level of the brew in the storage tank as sensed by the float operated switches 191 and 191', the interruption in the brewing of the brew does not affect the cycle of brewing other than the interruption thereof.

It should be noted that both cartridges may be removed for servicing by positioning the operating handle in the center position whereby the inlet devices are spaced from each of the cartridges.

The apparatus 10 automatically assures that in order for "Start Brewing" push buttons 18 or 19 to be effective to initiate a brewing cycle, the following conditions must be simultaneously met: (a) the selected storage tank must be empty; (b) the selected storage tank must be in place to receive the brew from the cartridge in the cabinet; (c) the selected cartridge must be in place in the cabinet; and (d) the control arm must be in the proper selected position to sealingly engage the inlet with the cartridge. In order to dispense the brew from the storage tank, the following conditions must be simultaneously met: (a) there must be brew in the selected storage tank; (b) the selected storage tank and associated cartridge must not be in a brewing cycle (this precludes delivering brew into a storage tank until the previous quantity has been removed therefrom); and (c) the decanter must be in position to receive the brew from the selected storage tank.

The apparatus 10 as indicated above is arranged for facilitated servicing and operation. To this end, the decanter fill station 12a may be formed integrally so as to include as a unit the stand portion including the pilot lights 270, 270' and 270'', the switches 264 and 268, the wall member 265, and the lamp structure 271.

Thus, the apparatus 10 is arranged for servicing of the cartridge and storage tank not in use without affecting the brewing operation of the in use portion of the apparatus. The servicing is extremely simple as discussed above. The dispensing of the brew from the storage tanks is accurately controlled at all times so as to effectively eliminate spillage on the fill stand portion. The apparatus is simple and economical to manufacture and the control system is arranged for facilitated operation and connection or disconnection to the cartridge and storage tank portions of the apparatus.

We claim:

1. Brewing apparatus comprising: a brewing device; a storage tank; means releasably supporting said tank subjacent said brewing device; control means; supply means adjacent said tank for providing hot water to said brewing device; and an enclosure for housing said brewing device, tank, control means and supply means including removable front wall means permitting access to said brewing device and tank, said supply means being arranged so that the removal of said tank provides access to said supply means.

2. The brewing apparatus of claim 1 wherein said control means is disposed adjacent said brewing device.

3. The brewing apparatus of claim 1 wherein said enclosure includes a removable top wall means permitting access to said control means.

4. The brewing apparatus of claim 1 wherein said apparatus includes a second brewing device supported in horizontally spaced relationship to said first named brewing device in said enclosure, and means for selectively connecting said hot water supply to said brewing devices for selective operation thereof.

5. The brewing apparatus of claim 1 including means for storing brew delivered from said brewing device; means for dispensing brew from said storing means, said enclosure means including a removable top wall means and being arranged to permit access to said storing means upon removal of said front wall means and said top wall means.

6. Beverage brewing apparatus comprising: a tank for storing brewed beverage, said tank having a discharge opening in the bottom thereof; a valve controlling flow of beverage through said opening; means for selectively opening said valve including a member connected to said valve and having a downwardly facing first shoulder; an operator including an upwardly facing second shoulder and means for selectively raising said second shoulder from a first position to a second superjacent position; and means for removably holding said valve member adjacent said operator to dispose said first shoulder in the path of movement of said second shoulder to be moved thereby, said valve beind disposed in a closed arrangement when the second shoulder is in said first position and in an open arrangement when the second shoulder is in said second position.

7. The brewing apparatus of claim 6 wherein said operator includes an actuator selectively engageable with said member and manually operable means associated with the actuator for causing the actuator to engage said member and dispose it to place said valve in the closed arrangement.

8. Beverage brewing apparatus comprising: a tank for storing brewed beverage, said tank having a discharge opening in the bottom thereof; a valve controlling flow of beverage through said opening; means for selectively controlling said valve including electrically operated means for moving the valve to an open position and means biasing the valve to a closed position; and manually operable means for forcing the valve to the closed position in the event of malfunctioning of the valve controlling means.

9. The brewing apparatus of claim 8 wherein said manually operable means includes a plunger, means biasing the plunger to force the valve to a closed position, and catch means for retaining the plunger selectively disengaged from the valve.

10. Beverage brewing apparatus comprising: a tank for storing brewed beverage, said tank having a cover provided with an opening therethrough, and a bottom wall provided with a discharge opening therethrough; a valve for controlling flow of beverage through said discharge opening; and means for selectively opening said valve including a valve stem connected to said valve and extending through said cover opening and having an upper end, and operating means removably secured to the valve stem for moving the valve stem up and down and permitting the valve stem to be withdrawn axially through said cover opening upon removal of said operating means from the stem.

11. The brewing apparatus of claim 10 including shoulder means extending adjacent said upper end for up and down movement, said operating means including a collar on said valve stem and means releasably holding said shoulder means against said collar.

12. The beverage brewing apparatus of claim 10 wherein said valve includes a support permanently secured to said valve stem and having a transverse dimension substantially greater than that of said cover opening and a jacket formed of resilient material removably covering said support and arranged to sealingly engage the bottom wall circumjacent said discharge opening to selectively close said discharge opening.

13. The beverage brewing apparatus of claim 10 wherein said valve stem includes a lower end, a downwardly narrowing frusto-conical support on said lower end having an annular groove in the upper end thereof, and a resilient jacket having a frusto-conical recess receiving said support and an inturned flange at the upper end of said recess removably received in said groove for retaining the jacket removably on said support.

14. Brewing apparatus comprising: a support; means defining a brewing chamber, including a bowl having an open top and an inwardly projecting catch adjacent the top, and a cover removably across said top having a first portion selectively retained under said catch, said cover having inlet and outlet openings therethrough; means for delivering hot water under pressure to said chamber including a connector having a resilient annular seal arranged for selective sealing engagement with said cover about said inlet opening, means on said support for carrying said bowl below said connector, and means for engaging said connector seal with said cover; and cooperating means on said support and cover to preclude upward movement of a second portion of the cover opposed to said first portion.

15. The brewing apparatus of claim 14 wherein said cover is provided with a retainer upstanding from a second portion thereof diametrically opposed to said first portion, and said apparatus further includes means engageable with the top of said retainer to preclude upward movement of said opposed portion of the cover.

16. The brewing apparatus of claim 15 wherein said retainer includes a handle portion adapted to be manually grasped for use in installing and removing the cover relative to the bowl.

17. Brewing apparatus comprising: a support; a tank for storing brewed beverage, said tank having a discharge opening; valve means carried by the tank for controlling said discharge opening, said valve means including an operating portion disposed outwardly of the tank; means for removably carrying the tank on said support in a preselected storage position; and valve operating means carried by the support adjacent said storage position and including means for engaging the valve means as a result of the disposition of the tank in the storage position.

18. The brewing apparatus of claim 17 further including heating means in the tank for heating beverage therein, said heating means having a connecting portion, sensing means on the tank for sensing the level of beverage therein, said sensing means including an actuator portion disposed outwardly of the tank, means for delivering energy to said heating means, said energy delivering means being carried on the support adjacent said storage position to have connection with said connecting portion of the heating means as a result of the disposition of the tank in the storage position, and control means carried on said support adjacent said storage position and including switch means disposed for actuation by said actuator portion of the sensing means as a result of the disposition of the tank in the storage position.

19. The brewing apparatus of claim 17 further including heating means in the tank for heating beverage therein, said heating means having a connecting portion, and means for delivering energy to said heating means, said energy delivering means being carried on the support adjacent said storage position to have connection with said connecting portion of the heating means as a result of the disposition of the tank in the storage position.

20. The brewing apparatus of claim 17 further including sensing means on the tank for sensing the level of beverage therein, said sensing means including an actuator portion disposed outwardly of the tank, and control means carried on said support adjacent said storage position and including switch means disposed for actuation by said actuator portion of the sensing means as a result of the disposition of the tank in the storage position.

21. The brewing apparatus of claim 17 further including an inlet opening in said tank, brewing means having a discharge spout for delivering brewed beverage therefrom, heating means in the tank for heating beverage therein, said heating means having a connecting portion, sensing means on the tank for sensing the level of beverage therein, said sensing means including an actuator portion disposed outwardly of the tank, said tank being disposed with the inlet opening positioned to receive brewed beverage from said discharge spout of the brewing means, means for delivering energy to said heating means, said energy delivering means being carried on the support adjacent said storage position to have connection with said connecting portion of the heating means as a result of the disposition of the tank in the storage position, and control means carried on said support adjacent said storage position and including switch means disposed for actuation by said actuator portion of the sensing means as a result of the disposition of the tank in the storage position.

22. Brewing apparatus comprising: a support; a tank for storing brewed beverage; means for removably supporting the tank on the support in a preselected storage position; means associated with said tank for heating beverage stored therein; and control means supported adjacent said position to be operative as a result of the disposition of said tank in said storage position.

23. The brewing apparatus of claim 22 wherein said control means comprises a thermal sensing means disposed in thermal transfer association with said tank.

24. The brewing apparatus of claim 22 including electrical heating means carried by said tank for heating beverage stored therein, said heating means having a connector portion wherein said control means comprises electrical control means arranged to have electrical connective association with said connector portion as a result of the disposition of said tank in said storage position.

25. Brewing apparatus comprising: a tank for storing and dispensing brew; means for heating brew in the tank; means for brewing brew and substantially concurrently delivering the brew to the storage tank; first control means responsive to the level of brew in the storage tank for energizing the heating means upon the level of brew in the storage tank reaching a preselected full level and controlledly continuing the energization of the heating means until the level reaches a preselected empty level; and second control means for energizing the heating means during the brewing operation.

References Cited

UNITED STATES PATENTS

| | | | |
|---|---|---|---|
| 2,898,843 | 8/1959 | Rockriver | 99—283 |
| 2,900,894 | 8/1959 | Tritt | 99—283 |
| 3,011,426 | 12/1961 | Mueller | 99—282 X |
| 3,126,812 | 3/1964 | Nau | 99—291 |
| 3,133,671 | 5/1964 | Christine | 99—283 |

ROBERT W. JENKINS, *Primary Examiner.*

U.S. Cl. X.R.

340—266; 346—17, 74, 102, 137, 145